US008757495B2

(12) United States Patent
Qu et al.

(10) Patent No.: US 8,757,495 B2
(45) Date of Patent: Jun. 24, 2014

(54) ENCODED INFORMATION READING TERMINAL WITH MULTI-BAND ANTENNA

(75) Inventors: Huyu Qu, San Jose, CA (US); Ynjiun P. Wang, Cupertino, CA (US); James T. Sauerwein, Jr., Charlotte, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 158 days.

(21) Appl. No.: 12/875,404

(22) Filed: Sep. 3, 2010

(65) Prior Publication Data

US 2012/0055988 A1   Mar. 8, 2012

(51) Int. Cl.
*G06K 7/10*   (2006.01)

(52) U.S. Cl.
USPC ............... 235/462.46; 235/454; 235/462.01

(58) Field of Classification Search
USPC .......... 235/375, 380, 435, 449, 451, 454, 235/462.01, 462.46, 472.02
See application file for complete search history.

(56) References Cited

U.S. PATENT DOCUMENTS

| | | | |
|---|---|---|---|
| 5,945,660 A * | 8/1999 | Nakasuji et al. ......... | 235/462.46 |
| 6,061,031 A * | 5/2000 | Cosenza et al. ............ | 343/770 |
| 6,208,312 B1 * | 3/2001 | Gould ........................ | 343/840 |
| 6,441,793 B1 * | 8/2002 | Shea ........................... | 343/753 |
| 6,952,594 B2 * | 10/2005 | Hendin ...................... | 455/552.1 |
| 6,992,628 B2 | 1/2006 | Rawnick et al. | |
| 7,068,234 B2 | 6/2006 | Sievenpiper | |
| 7,075,418 B2 * | 7/2006 | Miller ......................... | 340/447 |
| 7,164,387 B2 * | 1/2007 | Sievenpiper ................ | 343/702 |
| 7,277,062 B1 * | 10/2007 | Loyet ......................... | 343/795 |
| 7,340,274 B2 * | 3/2008 | Harano ....................... | 455/556.1 |
| 7,394,437 B1 * | 7/2008 | Loyet ......................... | 343/795 |
| 7,403,161 B2 | 7/2008 | DiNallo et al. | |
| 7,486,242 B2 | 2/2009 | Gala Gala et al. | |
| 7,515,107 B2 | 4/2009 | Saliga | |
| 7,519,390 B2 * | 4/2009 | Malone et al. ............. | 455/552.1 |
| 7,522,122 B2 * | 4/2009 | Yoon et al. ................. | 343/895 |
| 7,592,957 B2 | 9/2009 | Achour et al. | |
| 7,597,250 B2 * | 10/2009 | Finn ............................ | 235/380 |
| 7,639,199 B2 * | 12/2009 | Rofougaran ................ | 343/860 |
| 7,683,839 B2 * | 3/2010 | Ollikainen et al. ......... | 343/702 |
| 7,706,759 B2 * | 4/2010 | Rofougaran ................ | 455/121 |
| 7,706,770 B2 * | 4/2010 | Rofougaran ................ | 455/333 |
| 7,764,245 B2 * | 7/2010 | Loyet ......................... | 343/795 |
| 7,792,548 B2 * | 9/2010 | Rofougaran ................ | 455/562.1 |
| 7,848,386 B2 * | 12/2010 | Rofougaran ................ | 375/135 |
| 7,884,775 B1 * | 2/2011 | Loyet ......................... | 343/823 |
| 7,969,313 B2 * | 6/2011 | Smith et al. ................. | 340/572.7 |
| 8,010,062 B2 * | 8/2011 | Rofougaran ................ | 455/101 |

(Continued)

*Primary Examiner* — Paultep Savusdiphol
(74) *Attorney, Agent, or Firm* — Additon, Higgins, Pendleton & Ashe, P.A.

(57) ABSTRACT

An encoded information reading (EIR) terminal can comprise a microprocessor, a memory communicatively coupled to the microprocessor, an EIR device, a multi-band antenna, and a wireless communication interface. The EIR reading device can be provided by a bar code reading device, an RFID reading device, and/or a card reading device. The EIR device can be configured to output raw message data comprising an encoded message and/or output decoded message data corresponding to an encoded message. The wireless communication interface can be configured to support at least two wireless communication protocols. The multi-band antenna can be configured to simultaneously receive two or more radio signals in two or more frequency regulatory domains. The EIR terminal can be configured to dynamically select a wireless communication network and/or a wireless communication protocol by optimizing a value of a wireless communication protocol selection criterion which can be based on said two or more radio signals.

20 Claims, 11 Drawing Sheets

(56) References Cited

U.S. PATENT DOCUMENTS

| | | | |
|---|---|---|---|
| 2004/0102172 A1* | 5/2004 | Hendin | 455/302 |
| 2005/0119026 A1* | 6/2005 | Harano | 455/556.1 |
| 2005/0259011 A1* | 11/2005 | Vance | 343/702 |
| 2006/0028332 A1* | 2/2006 | Miller | 340/447 |
| 2006/0219776 A1* | 10/2006 | Finn | 235/380 |
| 2007/0161357 A1 | 7/2007 | Tudosoiu et al. | |
| 2007/0290938 A1* | 12/2007 | Loyet | 343/795 |
| 2008/0076353 A1* | 3/2008 | Rofougaran | 455/41.2 |
| 2008/0076476 A1* | 3/2008 | Rofougaran | 455/562.1 |
| 2008/0106476 A1* | 5/2008 | Tran et al. | 343/702 |
| 2008/0122698 A1* | 5/2008 | Ollikainen et al. | 343/700 MS |
| 2008/0122723 A1* | 5/2008 | Rofougaran | 343/861 |
| 2008/0233888 A1* | 9/2008 | Saliga | 455/73 |
| 2008/0258981 A1 | 10/2008 | Achour et al. | |
| 2009/0051604 A1 | 2/2009 | Zhang et al. | |
| 2009/0253451 A1* | 10/2009 | Trachewsky | 455/509 |
| 2009/0316612 A1 | 12/2009 | Poilasne et al. | |
| 2010/0045554 A1 | 2/2010 | Xu et al. | |
| 2010/0053009 A1* | 3/2010 | Rofougaran | 343/747 |
| 2010/0060531 A1* | 3/2010 | Rappaport | 343/702 |
| 2010/0109955 A1* | 5/2010 | Anguera et al. | 343/702 |
| 2010/0123635 A1 | 5/2010 | Lopez et al. | |

* cited by examiner

| 540 Geographic Location | 550 Traffic Destination | 560 Wireless Network | 560 Wireless Protocol | 580 Wireless Protocol Parameter |
|---|---|---|---|---|
|  |  |  |  |  |
|  |  |  |  |  |
|  |  |  |  |  |

FIG. 6

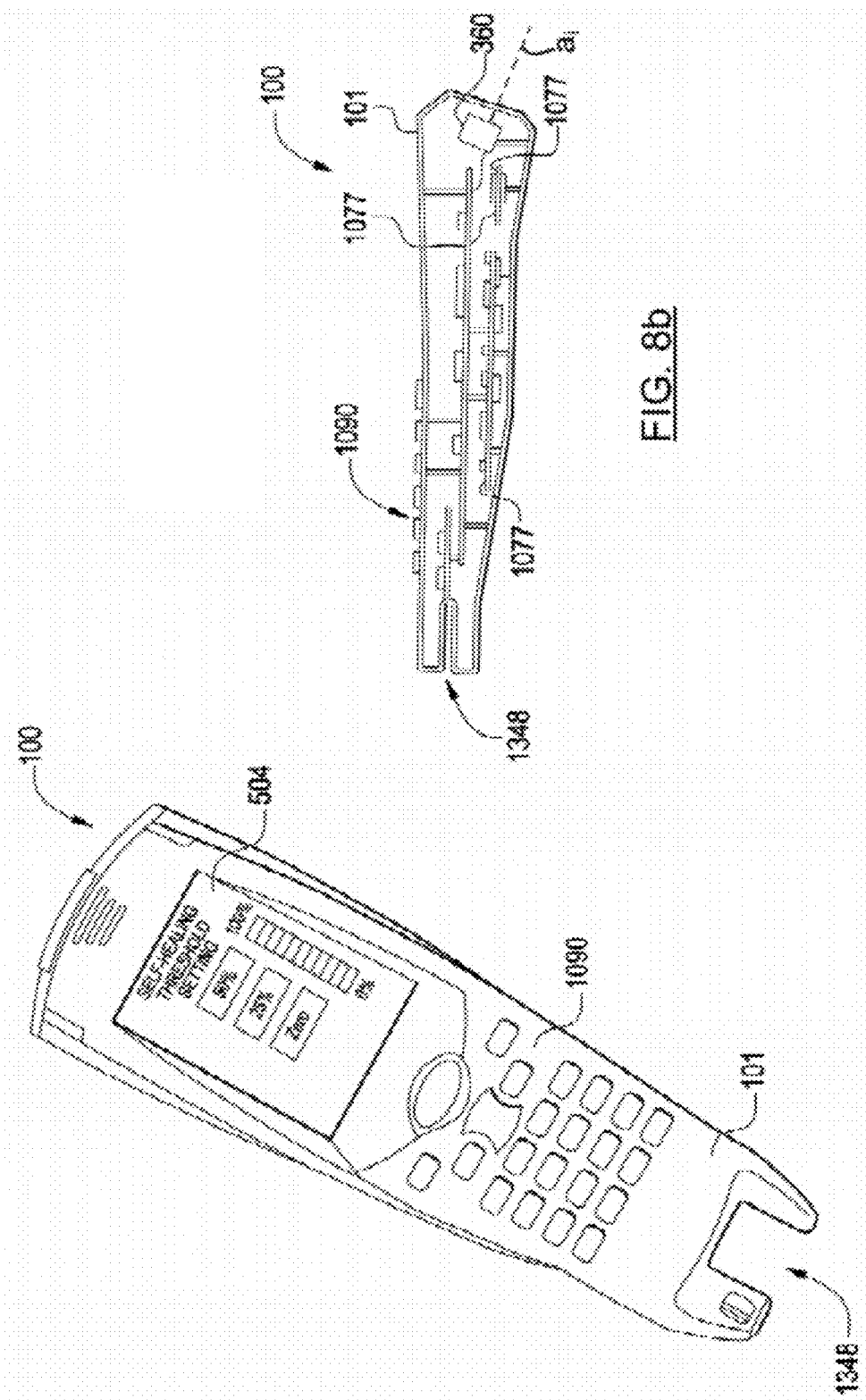

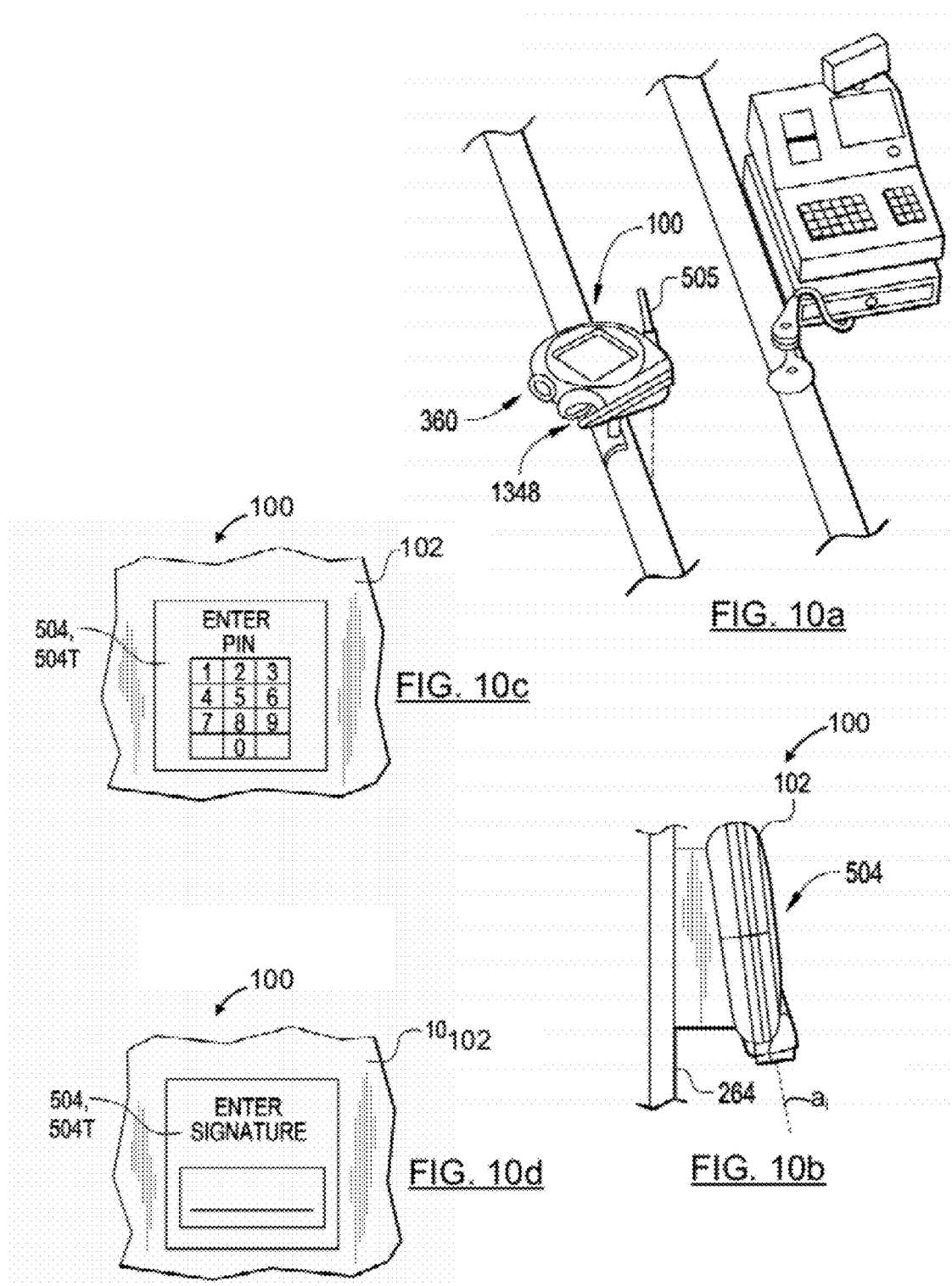

ENCODED INFORMATION READING TERMINAL WITH MULTI-BAND ANTENNA

FIELD OF THE INVENTION

The invention is generally related to encoded information reading (EIR) terminals and is specifically related to an EIR terminal comprising a multi-protocol wireless communication interface capable of seamlessly switching wireless communication networks or protocols.

BACKGROUND OF THE INVENTION

Encoded information reading (EIR) terminals equipped with wireless communication interfaces are widely used in retail stores, shipping facilities, etc. While wireless communication of EIR terminals offers many advantages as compared to wired communications, traditional wireless communication interfaces demonstrate noticeable shortcomings, e.g., by failing to support more than one communication protocol and/or standard, or by failing to switch wireless communication networks/protocols without restarting the EIR terminal.

Accordingly, there is a need for further advances in EIR terminals and systems which would support seamless switching between communication networks and/or protocols.

SUMMARY OF THE INVENTION

In one embodiment, there is provided an encoded information reading (EIR) terminal comprising a microprocessor, a memory communicatively coupled to the microprocessor, an EIR device, a multi-band antenna, and a wireless communication interface.

The EIR reading device can be provided by a bar code reading device, an RFID reading device, and/or a card reading device. The EIR device can be configured to output raw message data comprising an encoded message and/or output decoded message data corresponding to an encoded message.

The wireless communication interface can be configured to support at least two wireless communication protocols and/or at least two frequency bands. The multi-band antenna can be configured to simultaneously receive two or more radio signals in two or more frequency regulatory domains. The EIR terminal can be configured to dynamically select a wireless communication network and/or a wireless communication protocol and/or a frequency band by optimizing a value of a wireless communication protocol selection criterion which can be based on said two or more radio signals.

In another embodiment, there is provided an encoded information reading (EIR) terminal comprising a microprocessor, a memory communicatively coupled to the microprocessor, an EIR device, an antenna configured to simultaneously receive two or more radio signals in two or more frequency regulatory domains, and a wireless communication interface configured to support at least two wireless communication protocols.

The EIR reading device can be provided by a bar code reading device, an RFID reading device, and/or a card reading device. The EIR device can be configured to output raw message data comprising an encoded message and/or output decoded message data corresponding to an encoded message.

The wireless communication interface can comprise a radio frequency (RF) front end configured to receive a first radio signal and/or transmit a second radio signal. The RF front can be electrically coupled to the antenna. The antenna can be provided by two or more single-band antennas or by a multi-band antenna.

The microprocessor can be configured to execute at a base band encoder software program and a base band decoder software program.

The EIR terminal can be configured to dynamically select a wireless communication network and/or a wireless communication protocol by optimizing a value of a wireless communication protocol selection criterion which can be based on said two or more radio signals.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 6 illustrates the structure of one embodiment of a least-cost routing (LCR) look-up table according to the invention.

FIGS. 8a and 8b illustrate an exemplary hand held EIR terminal housing;

FIG. 10a illustrates a first exemplary deployment of an EIR terminal according to the invention within a retail store;

FIG. 10b illustrates a second exemplary deployment of an EIR terminal according to the invention within a retail store;

FIGS. 10c and 10d illustrate PIN and signature data entry operational modes of an EIR terminal according to the invention.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
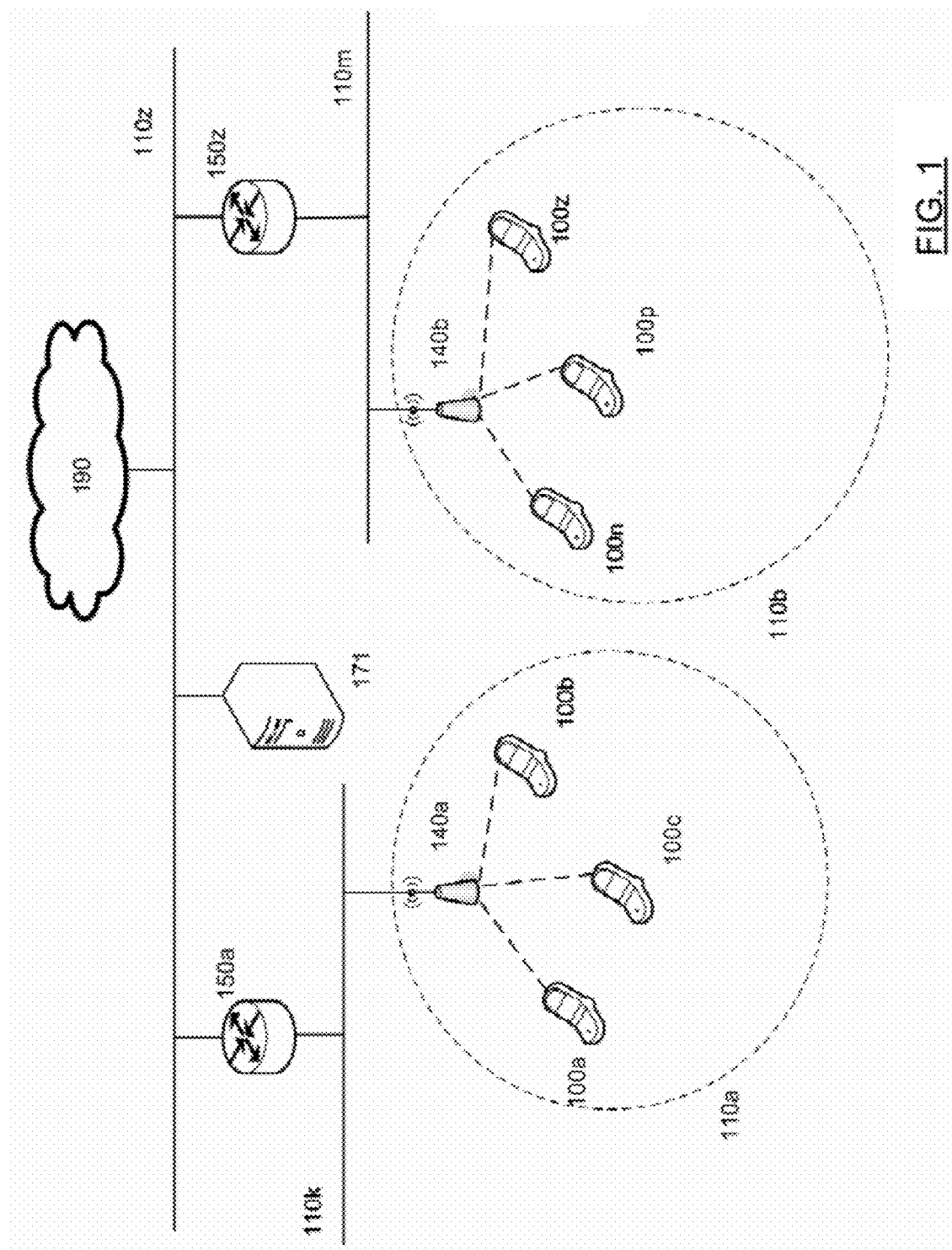
FIG. 1 depicts a network-level layout of a data collection system employing EIR terminal according to the invention.

There is provided an encoded information reading (EIR) terminal for incorporation in a data collection system. The data collection system, schematically shown in FIG. 1, can include a plurality of EIR terminals 100a-100z in communication with a plurality of interconnected networks 110a-110z. In one aspect, the plurality of networks 110a-110z can include at least one IEEE 802.11-conformant wireless network. In another aspect, the plurality of networks 110a-110z can include at least one IEEE 802.15-conformant wireless network. In a further aspect, the plurality of networks 110a-110z can include at least one IEEE 802.16-conformant wireless network. In another aspect, the plurality of networks 110a-110z can include at least one GSM-family wireless network, e.g., a wireless network supporting GSM, GPRS, EDGE, UMTS (WCDMA/TD-SCDMA), or HSPA/HSPA+ wireless communication protocol. In a further aspect, the plurality of networks 110a-110z can include at least one CDMA-family wireless network, e.g., a wireless network supporting CDMA, CDMA2000 and/or CDMA 1xEvDo wireless communication protocol. In a further aspect, the plurality of networks 110a-110z can include at least one wireless network supporting TDMA wireless communication protocol. In a further aspect, the plurality of networks 110a-110z can include at least one 4G wireless network, e.g., a wireless network supporting LTE (FDD-LTE or TD-LTE), UWB or 802.16m (WiMax) wireless communication protocol. In a further aspect, the plurality of networks 110a-110z can include at least one Bluetooth network. A skilled artisan would appreciate the fact that wireless networks implementing other wireless communication protocols are within the spirit and the scope of the invention.

In a further aspect, an EIR terminal can comprise a wireless communication interface which can be used by the terminal to connect to one or more wireless networks. The EIR terminal 100c can establish a communication session with the host computer 171. In one embodiment, network frames can be exchanged by the EIR terminal 100c and the host computer 171 via one or more routers 150a, 150z, base stations 140a, 140b, and other infrastructure elements. In another embodiment, the host computer 171 can be reachable by the EIR terminal 100c via a local area network (LAN) 190. In a yet another embodiment, the host computer 171 can be reachable by the EIR terminal 100c via a wide area network (WAN) 190. A skilled artisan would appreciate the fact that other methods of providing interconnectivity between the EIR terminal 100c and the host computer 171 relying upon LANs, WANs, virtual private networks (VPNs), and/or other types of network are within the spirit and the scope of the invention.

In one embodiment, the communications between the EIR terminal 100c and the host computer 171 can comprise a series of HTTP requests and responses transmitted over one or more TCP connections. In one embodiment, the communications between the EIR terminal 100c and the host computer 171 can comprise VoIP traffic transmitted over one or more TCP and/or UDP ports. A skilled artisan would appreciate the fact that using other transport and application level protocols is within the scope and the spirit of the invention.

In one aspect, at least one of the messages transmitted by the EIR terminal can include decoded message data corresponding to, e.g., a bar code label or an RFID label attached to a product or to a shipment item. For example, an EIR terminal can transmit a request to the host computer to retrieve product information corresponding to a product identifier encoded by a bar code label attached to the product, or to transmit an item tacking record for an item identified by a bar code label attached to the product.

Figure 2:
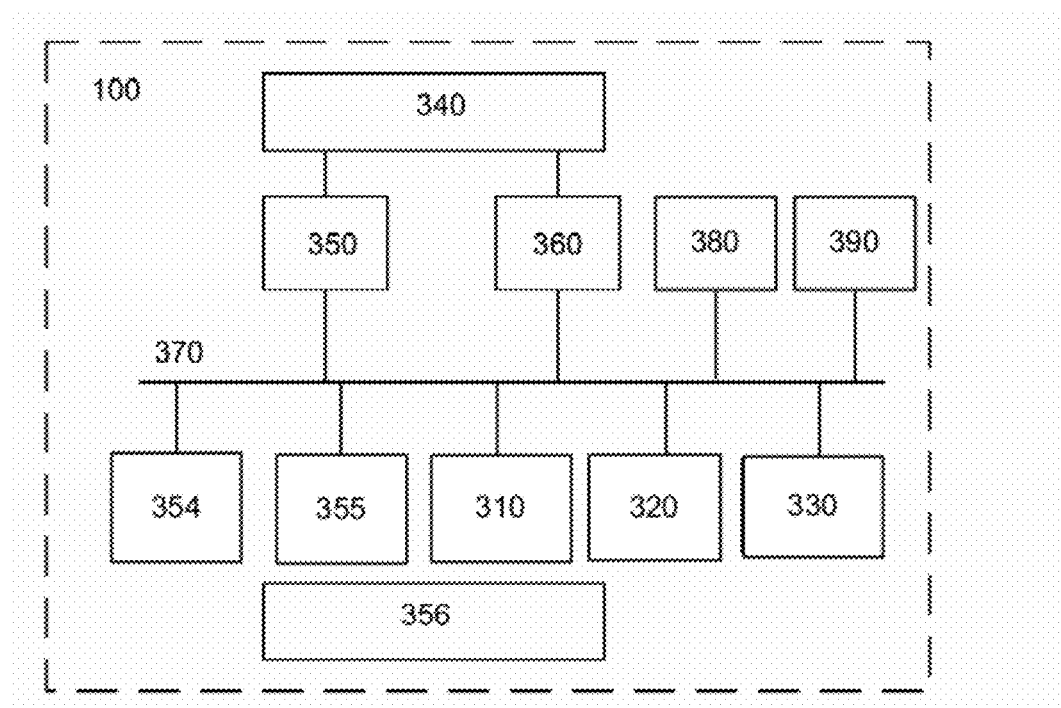
FIG. 2 depicts component-level layout of an EIR terminal according to the invention.

In another aspect, the EIR terminal 100 can further comprise at least one microprocessor 310 and a memory 320, both coupled to the system bus 370, as best viewed in FIG. 2. The microprocessor 310 can be provided by a general purpose microprocessor or by a specialized microprocessor (e.g., an ASIC). In one embodiment, the EIR terminal 100 can comprise a single microprocessor which can be referred to as a central processing unit (CPU). In another embodiment, the EIR terminal 100 can comprise two or more microprocessors 310, 350, for example a CPU and a specialized microprocessor (e.g., an ASIC). In one embodiment, the memory 320 can be provided by RAM, ROM, EPROM, and/or SIM card-based memory.

The EIR terminal 100 can further comprise one or more encoded information reading (EIR) devices 330, including a bar code reading device, an RFID reading device, and a card reading device, also coupled to the system bus 370. In one embodiment, an EIR reading device can be capable of outputting decoded message data corresponding to an encoded message. In another embodiment, the EIR reading device can output raw message data comprising an encoded message, e.g., raw image data or raw RFID data.

Of course, devices that read bar codes, read RFID, or read cards bearing encoded information may read more than one of these categories while remaining within the scope of the invention. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is a device that read bar codes for purposes of the present invention The EIR terminal 100 can further comprise a keyboard interface 354, a display adapter 355, both also coupled to the system bus 370. The EIR terminal 100 can further comprise a battery 356.

In one embodiment, the EIR terminal 100 can further comprise a GPS receiver 380. In one embodiment, the EIR terminal 100 can further comprise at least one connector 390 configured to receive a subscriber identity module (SIM) card.

As mentioned herein supra, an EIR terminal according to the invention can further comprise a wireless communication interface 340. In one embodiment, the wireless communication interface can be configured to support at least two wireless communication protocols. In a further aspect, the wireless communication interface can be configured to support two or more of GSM, GPRS, EDGE, UMTS (WCDMA/TD-SCDMA), HSPA/HSPA+, CDMA, CDMA2000, CDMA 1xEvDo, TDMA, LTE (FDD-LTE or TD-LTE), UWB, 802.11, 802.15, or 802.16m (WiMax) protocols. A skilled artisan would appreciate the fact that wireless communication interfaces supporting other communication protocols are within the spirit and the scope of the invention.

Figure 3:
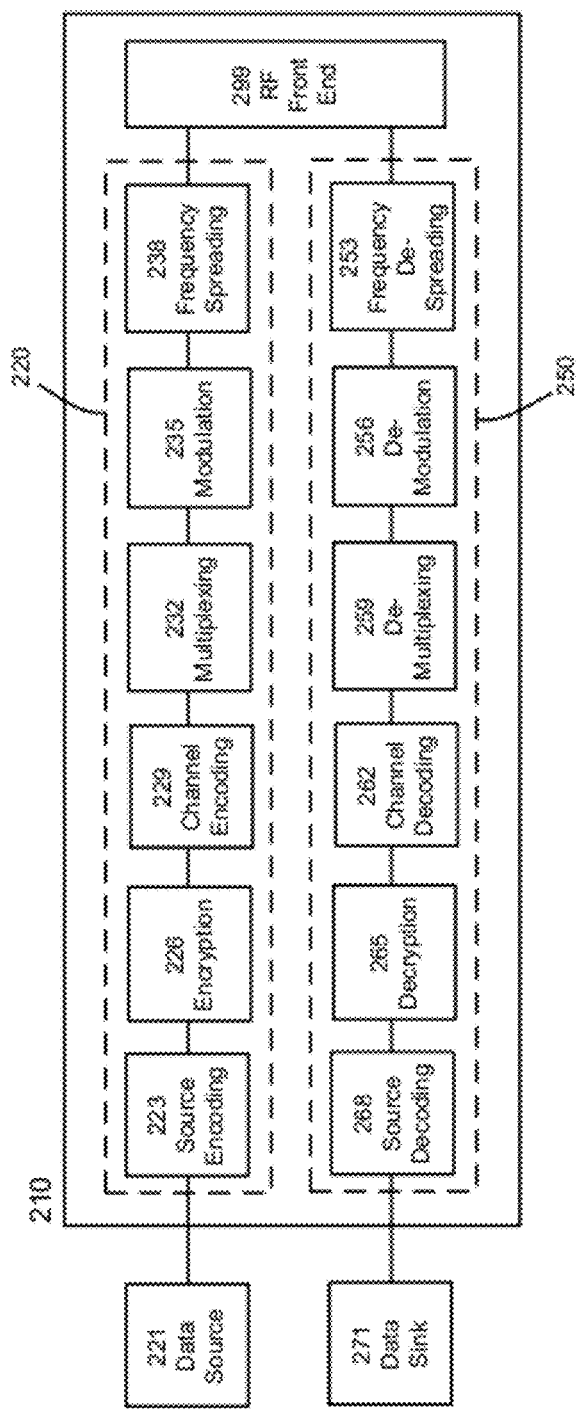
FIG. 3 depicts a functional layout of a wireless communication interface.

As best viewed in FIG. 3, the wireless communication interface 210 can comprise a transmitter circuit 220 electrically coupled to a data source 221. The transmitter circuit 220 can be implemented by one or more specialized microchips, and can perform the following functions: source encoding 223, encryption 226, channel encoding 229, multiplexing 232, modulation 235, and frequency spreading 238.

The wireless communication interface 210 of FIG. 3 can further comprise a receiver circuit 250 electrically coupled to the data sink 271. The receiver circuit 250 can be implemented by one or more specialized microchips, and can perform the following functions: frequency de-spreading 253, demodulation 256, de-multiplexing 259, channel decoding 262, decryption 265, and source decoding 268.

Each of the transmitter circuit 220 and receiver circuit 250 can be electrically coupled to an RF front end 299. The RF front end 299 can be used to convert high frequency RF signals to/from base-band or intermediate frequency signals. A skilled artisan would appreciate the fact that RF front ends of different data rates, sensitivities, output powers, operating frequencies, and measurement resolutions are within the scope and spirit of the invention.

On the receiving side, the RF front-end 299 can include all filters, low-noise amplifiers (LNAs), and down-conversion mixer(s) needed to process modulated RF signals received by the antenna into based-band signals. In one embodiment, the receiving part of the RF front end 299 can comprise one or more of the following components: a first matching circuit to transfer to the next stage the energy received by the antenna, a band-pass filter (BPF) to knock down out-of-band jammers; a second matching circuit at the input of a low-noise amplifier (LNA), the LNA, the primary responsibility of which is to set the sensitivity of the receiver by providing a high gain; a third matching circuit between the LNA output and the receive (RX) mixer (down-converter), and the down-conversion RX mixer.

On the transmitting side, the RF frond-end can be described as a "mirrored" version of a receiver. The front end of a transmitter up converts an outgoing base band signal and then feeds the signal to a high power amplifier. A skilled artisan would appreciate the fact that other ways of implementing the RF front end are within the spirit and the scope of the invention.

In one embodiment, the wireless communication interface supporting at least two wireless communication protocols can be implemented using a single dual-protocol (or multi-protocol) chipset. The chipset can include integrated circuits (ICs), application-specific integrated circuits (ASICs), and/or other components providing the necessary functionality.

In another embodiment, the wireless communication interface supporting at least two wireless communication protocols can be implemented using two or more chipsets. Each of the chipsets can include integrated circuits (ICs), application-specific integrated circuits (ASICs), and/or other components providing the necessary functionality.

In a further aspect, the RF front end can be electrically coupled to an antenna of FIG. 2. In one embodiment, the antenna can be provided by two or more single-band antennas. In another embodiment, the antenna can be provided by a multi-band antenna.

In a further aspect, the antenna can be configured to simultaneously receive RF signals in two or more frequency regulatory domains. In another aspect, the antenna can be configured to transmit RF signals in two or more frequency regulatory domains. The frequency regulatory domains supported by the multi-band antenna can include 850 MHz (824-894 MHz), 900 MHz (880-960 MHz), 1700 MHz, 1800 MHz (1710-1880 MHz), 1900 MHz (1850-1990MHz), 2100 MHz (1920-2170 MHz), 2.4 GHz (2400-2484 MHz), and 5 GHz. A skilled artisan would appreciate the fact that antennas supporting other frequency regulatory domains are within the spirit and the scope of the invention.

In one embodiment, the multi-band antenna can be made of a conductive material (e.g., a metal). In another embodiment, the multi-band antenna can be made of a non-conductive material (e.g., a plastic), and can further be coated by a conductive material. In a further embodiment, the multi-band antenna can be made of a non-conductive material (Rogers, RT/duroid 5880, Arlon AD250, Polyester, GML1000, Polyimide, Getek, FR4, etc.), and can further be covered by a conductive material. A skilled artisan would appreciate the fact that antennas made of different conductive or non-conductive materials are within the spirit and the scope of the invention.

Figure 4:
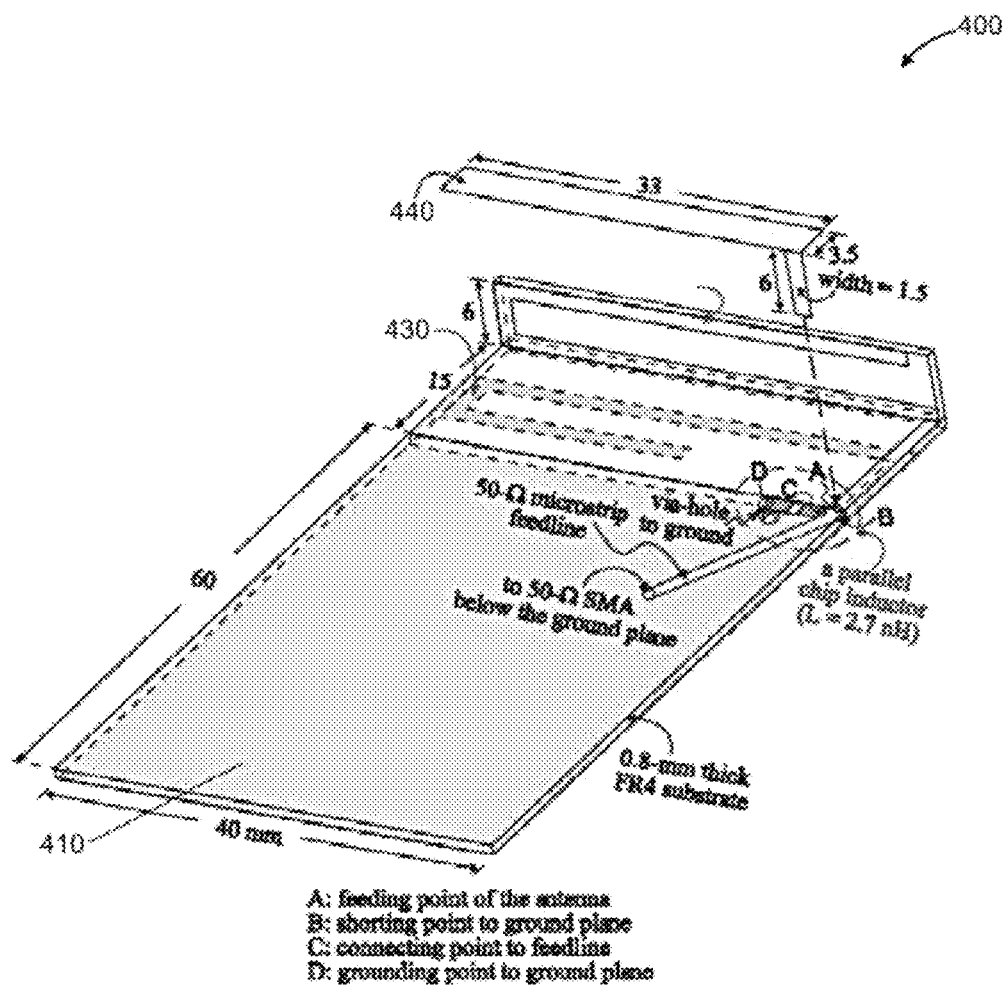
FIG. 4 illustrates an example of a six-band antenna with three.

In another aspect, the multi-band antenna can comprise a ground plane and one or more monopoles (patches). FIG. 4 illustrates an example of a six-band antenna with monopoles. A multi-band antenna 400 can include a ground plane 410, and monopoles 430 and 440, as best viewed in FIG. 4. In another aspect, the multi-band antenna can comprise one or more multiple feeds. In a yet another aspect, the multi-band antenna can comprise a splitter/diplexer. In a further aspect, the multi-band antenna can comprise an impedance matching circuit. A skilled artisan would appreciate the fact that other multi-band antennas comprising a ground plane and two or more monopoles are within the scope and the spirit of the invention.

In one embodiment, the multi-band antenna can be provided by a metamaterial (MTM) antenna. Metamaterials are artificial composite materials engineered to produce a desired electromagnetic behavior which surpasses that of natural materials. MTM-based objects can include structures which are much smaller than the wavelength of electromagnetic waves propagating through the material. MTM technology advantageously allows for precise control of the propagation of electromagnetic waves in the confines of small structures by determining the values of operating parameters which can include operating frequency, bandwidth, phase offsets, constant phase propagation, matching conditions, and number and positioning of ports.

In one aspect, an MTM-based antenna can be physically small as compared to other types of antennas: an MTM-based antenna can be sized, for example, on the order of one tenths of a signal's wavelength, while providing performance equal to or better than an antenna made of a conventional material and sized on the order of one half of the signal's wavelength. In another aspect, an MTM-based antenna can have two or more operational frequencies tailored to specific applications and not limited to harmonic frequency multiples. In a further aspect, an MTM-based component (e.g., a broadband matching circuit, a phase-shifting component, or a transmission line) can preserve phase linearity over frequency ranges which is five to ten times greater than those provided by components made of conventional materials.

Figure 5A:
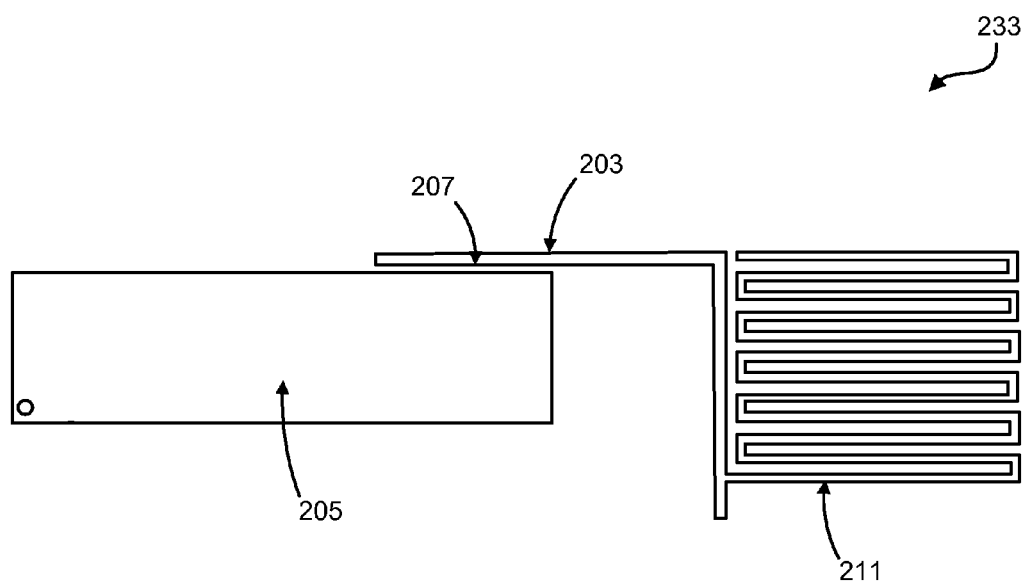
FIGS. 5a-5b illustrate a top view and a bottom view of an example layout of a three-band MTM-based antenna.
Figure 5B:
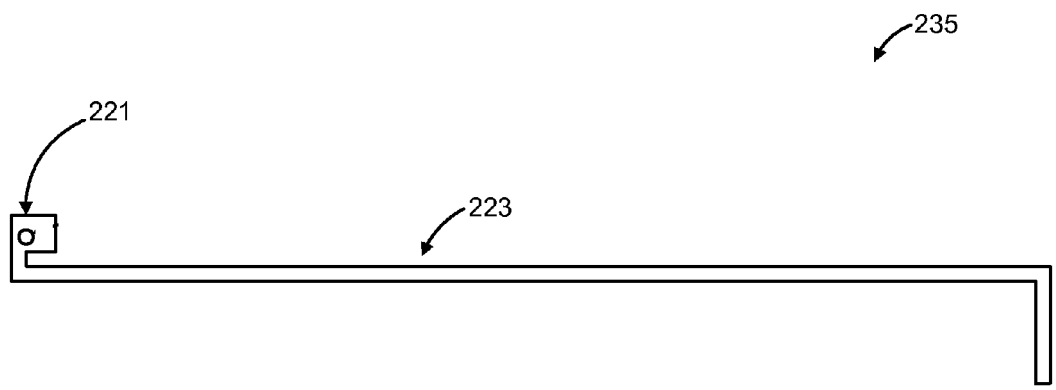

In a further aspect, an MTM-based multi-band antenna can have a simple two-dimensional design with a metallic artwork printed directly on a PCB board using standard PCB manufacturing techniques. FIGS. 5*a*-5*b* illustrate a top view and a bottom view of an example layout of a three-band MTM-based antenna which covers 800 M, 900 M, and 2400 M bands.

Referring to FIGS. 5*a*-5*b*, a feed line 203, 223 is formed in the top layer 233, 235 and the distal end of the feed line 203, 223 is electromagnetically coupled to a cell patch 205, 221 also formed in the top layer 233, 235, through a coupling gap 207. Power is delivered to the cell patch 205, 221 from the grounded CPW feed 211 through the feed line 203, 223 and the coupling gap 207.

A skilled artisan would appreciate the fact that other two-dimensional and three-dimensional layouts of MTM-based multi-band antennas are within the scope and the spirit of the invention.

In a further aspect, an MTM-based multi-band antenna can have an ultra-compact size (e.g., on the order of one tenth of the operating wavelength, which can be a surface area smaller than 10 mm by 50 mm, and can be as thin as paper).

In a further aspect, an MTM-based multi-band antenna can support four to six frequency bands by comprising multiple feeds thus eliminating the need for splitter-diplexers.

In a further aspect, an MTM-based multi-band antenna can simultaneously support receiving and/or transmitting radio signals which can be compliant to several wireless standards (e.g., GSM, GPRS, EDGE, UMTS (WCDMA/TD-SCDMA), HSPA/HSPA+, CDMA, CDMA2000, CDMA 1xEvDo, TDMA, LTE (FDD-LTE or TD-LTE), UWB, 802.11, 802.15, or 802.16m (WiMax)) without undesired coupling.

In one embodiment, the EIR terminal 100 can be configured to dynamically select a wireless communication network and/or a wireless communication protocol to be used by the wireless communication interface 340, by optimizing a value of a wireless communication protocol selection criterion. In one embodiment, the value of the wireless communication protocol selection criteria can be evaluated by a wireless communication protocol selection software program which can be executed by the EIR terminal.

In one embodiment, the EIR terminal can be configured to simultaneously receive two or more radio signals over two or more wireless communication networks and/or protocols, and then evaluate the pre-defined wireless communication protocol selection criterion values for each of the communication networks/protocols where the radio signals have been received, in order to select a wireless communication network and/or protocol which would produce the optimal value of the wireless communication protocol selection criterion.

In one embodiment, the wireless communication protocol selection criterion can comprise a combination of two or more criteria. In a further aspect, the wireless communication protocol selection criterion can comprise a weighted sum of two or more criteria. A skilled artisan would appreciate the fact that other methods of combining two or more criteria are within the scope and the spirit of the invention.

In one embodiment, the wireless communication protocol selection criterion can be based on the wireless network status, by yielding an available wireless network.

In one embodiment, the wireless communication protocol selection criterion can be based on the signal strength of each of radio signals received. In one aspect, the signal strength-based wireless communication protocol selection criterion can yield an available wireless network with a maximum value of the signal strength.

In one embodiment, the wireless communication protocol selection criterion can be based on the wireless network throughput, by yielding an available wireless network which can satisfy a throughput requirement.

In one embodiment, the wireless communication protocol selection criterion can be based on the wireless network usage cost. In one aspect, the EIR terminal can optimize the wireless network usage cost by evaluating a least cost routing (LCR) criterion. In one embodiment, the LCR criterion value can be equal to the cost of delivering the outbound traffic initiated by the EIR terminal. In another embodiment, the LCR criterion value can be equal to the cost of accepting the inbound traffic initiated by the EIR terminal. In a yet another embodiment, the LCR criterion value can be equal to the sum of the cost of delivering the outbound traffic initiated by the EIR terminal and the cost of accepting the inbound traffic initiated by the EIR terminal.

In one embodiment, the LCR criterion can be evaluated using an LCR look-up table mapping a wireless communication protocol and/or wireless communication network to the destination of the EIR terminal-originated traffic. In another embodiment, the LCR criterion can be evaluated using a look-up table mapping a wireless communication protocol and/or wireless communication network to the geographic location of the EIR terminal and destination of the EIR terminal-originated traffic. The structure of one embodiment of the LCR look-up table is schematically shown in FIG. 6. The LCR look-up table 500 can include one or more records 510, 520, each of the records comprising a traffic destination field 550, a wireless communication network field 560, a wireless communication protocol field 570, and a wireless communication protocol parameter field 580. In another embodiment, each of the records 510, 520 can further comprise a geographic location field 540.

In one embodiment, the geographic location field 540 can comprise the geographical coordinates or geographical coordinate ranges of the EIR terminal location. In another embodiment, the geographic location field 540 can comprise the country, state, and/or city of the EIR terminal location. A skilled artisan would appreciate the fact that other ways of encoding the EIR terminal location are within the spirit and the scope of the invention.

In one embodiment, the traffic destination field 550 can comprise the country, state, and/or city of the EIR terminal location. A skilled artisan would appreciate the fact that other ways of encoding the traffic destination are within the spirit and the scope of the invention.

In one embodiment, the wireless communication protocol selection criterion can be evaluated upon the EIR terminal being powered on. In another embodiment, the wireless communication protocol selection criterion can be evaluated immediately before the EIR terminal attempting to initiate a communication session. In a yet another embodiment, the wireless communication protocol selection criterion can be evaluated periodically at pre-defined time intervals so that the EIR terminal can change the wireless communication network and/or the wireless communication protocol between communication sessions or during a communication session if a wireless communication network and/or a wireless communication protocol is detected yielding a value of the wireless communication protocol selection criterion which is closer to the optimum than that of the current network or protocol. In a yet another embodiment, the value of the wireless communication protocol selection criterion can be calculated responsive to the EIR terminal changing its geographic location, so that the EIR terminal can automatically (i.e., without user intervention) change the wireless communication network and/or the wireless communication protocol between communication sessions or during a communication session. Thus, the EIR terminal can always maintain an optimal network connection irrespectively of changing external conditions (e.g., when the terminal is physically moved).

In another aspect, the EIR terminal can select a wireless network, wireless communication protocol, and/or a wireless communication protocol parameter based on the contents of a preferred routing list (PRL) or a preferred operator list (POL) which can be stored locally in the memory 320. The PRL or POL can contain an ordered list of network operators to be used by the EIR terminal.

In one embodiment, the PRL (POL) can contain a list of records, each of those records containing a wireless network operator identifier and a preference value.

Figure 7:
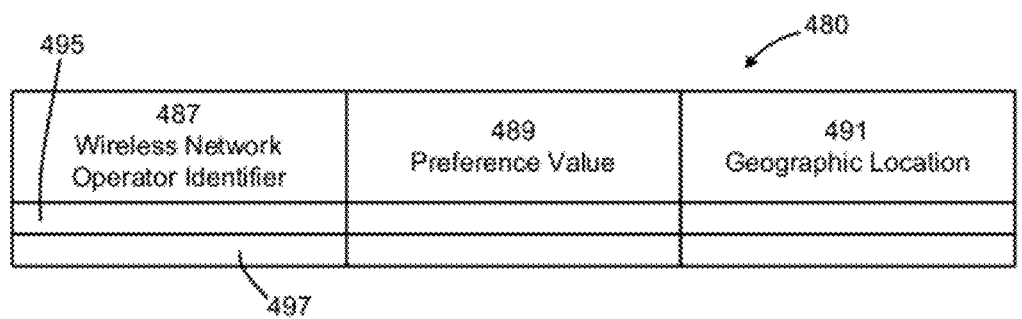
FIG. 7 illustrates the structure of one embodiment of a preferred routing list (preferred operator list) according to the invention.

The structure of one embodiment of the PRL (POL) table is schematically shown in FIG. 7. The PRL (POL) look-up table 480 can include one or more records 495, 497, each of the records comprising a wireless network operator identifier 487 and a preference value 489. In one embodiment, each of the PRL (POL) records 495, 497 can further comprise a geographic location field 491. In another embodiment, the contents of the PRL (POL) table 480 can be updated responsive to the EIR terminal changing its geographic location.

In another aspect, the PRL (POL) table 480 can be initialized by the manufacturer of the EIR terminal. In another embodiment, the PRL (POL) table 480 can be initialized and/or modified by the operator of the wireless network to which the EIR terminal is connected. In a yet another embodiment, the PRL (POL) table 480 can be initialized and/or modified by the user of the EIR terminal via a user interface.

In another aspect, initialization and/or modification of the PRL (POL) table 480 can be initiated manually by the user of the EIR terminal by scanning a pre-defined bar code, or by the user interacting with the user interface (e.g., via a graphical user interface (GUI), or via a hardware-implemented control). A skilled artisan would appreciate the fact that other methods of initializing and/or modifying the PRL (POL) table 480 are within the scope and the spirit of the invention.

In another aspect, the EIR terminal 100 can be configured to support multi-tasking mode, e.g., by running a multi-tasking operating system. In one embodiment, the EIR terminal can be configured to run Windows Mobile operating system. In another embodiment, the EIR terminal can be configured to run embedded Linux operating system. In a yet another embodiment, the EIR terminal can be configured to run embedded Android operating system. A skilled artisan would appreciate the fact that EIR terminal running other embedded multi-tasking operating systems are within the spirit and the scope of the invention.

An EIR terminal running a multi-tasking operating system can execute the wireless communication protocol selector software program in parallel with executing other software programs, including system and/or application software programs. In one embodiment, a system software program and/or an application software program can be executed by an EIR terminal in parallel with the wireless communication protocol selector software program evaluating the wireless communication protocol selection criterion and switching the wireless communication network and/or wireless communication protocol. Thus, switching the wireless communication network and/or wireless communication protocol by an EIR terminal according to the invention does not require re-setting the terminal or re-starting system and/or application software programs which were running when switching the wireless communication network and/or wireless communication protocol had been initiated by the wireless communication protocol selector software program.

In another aspect, selection of a wireless communication network, a wireless communication protocol, or one or more parameters of a wireless communication protocol can be initiated manually by the user of the EIR terminal. In one embodiment, the selection can be initiated by scanning a pre-defined bar code. In another embodiment, the selection can be initiated by the user interacting with the user interface (e.g., via a graphical user interface (GUI), or via a hardware-implemented control). A skilled artisan would appreciate the fact that other methods of manually initiating selection of a wireless communication network, a wireless communication protocol, or one or more parameters of the wireless communication protocol are within the scope and the spirit of the invention.

In another aspect, the wireless communication protocol selector software program can be invoked be another software program executed by the EIR terminal. The invoking software program can be developed by the EIR terminal manufacturer or by a third party application developer.

Due to its ability to dynamically select a wireless communication network and a wireless communication protocol, the EIR terminal according to the present invention can be advantageously used, e.g., by a company operating in several geographies with different wireless communication standards. Using the EIR terminal according to the present invention would allow such a company to deploy the same EIR terminal model in all the geographies.

In another aspect, the EIR terminal according to the invention can be configured to store in memory 320 at least one wireless account data structure. In one embodiment, a wireless account data structure can comprise a wireless account identifier and a PRL (POL). A skilled artisan would appreciate the fact that wireless account data structures comprising other wireless account information are within the spirit and the scope of the invention.

Form factors and housings for the EIR terminal according to the invention are now being described. The components of EIR terminal 100 can be incorporated into a variety of different housings. As indicated by the embodiment of FIGS. 8a and 8b, the components of FIG. 2 can be incorporated into a hand held housing 101. EIR terminal 100 of FIGS. 8a and 8b is in the form factor of a hand held portable data terminal. EIR terminal 100 as shown in FIGS. 8a and 8b includes a keyboard 1090, a display 504 having an associated touch screen overlay, a card reader 1348, an imaging module 360, a GPS receiver, an RFID transceiver, a WWAN (2G/3G/4G) transceiver, a WLAN (IEEE 802.11-confirmant) transceiver, a laser module, and/or WPAN (802.15/Bluetooth) transceiver.

Imaging module 360 can include the components of imaging assembly as described herein; namely, image sensor array incorporated on an image sensor IC chip. Imaging module 360 has an associated imaging axis, $a_i$. As indicated by the side view of FIG. 8b, the components of the block diagram of FIG. 2 may be supported within housing 101 on a plurality of circuit boards 1077. Imaging module 360 may include an image sensor array having color sensitive pixels as described in Provisional Patent Application Nos. 60/687,606, filed Jun. 3, 2005, 60/690,268, filed Jun. 14, 2005, 60/692,890, filed Jun. 22, 2005, and 60/694,371, filed Jun. 27, 2005, all of which are entitled Digital Picture Taking Optical Reader Having Hybrid Monochrome And Color Image Sensor, and all of which are incorporated herein by reference.

Figure 9A:
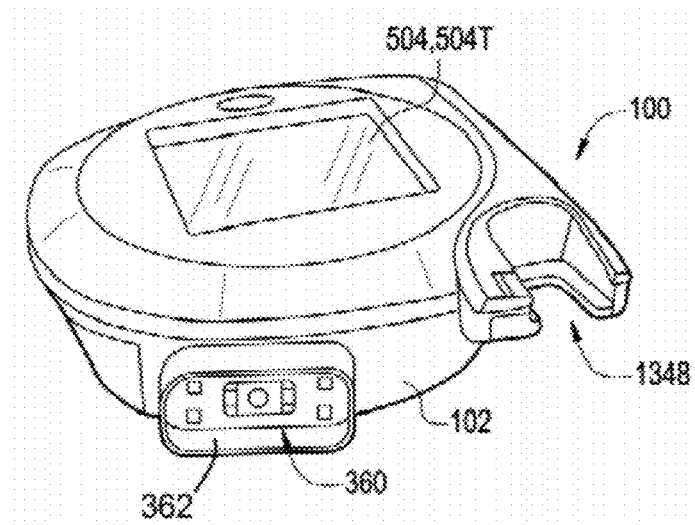
FIGS. 9a-9c illustrate an exemplary portable and remountable EIR terminal housing.
Figure 9B:
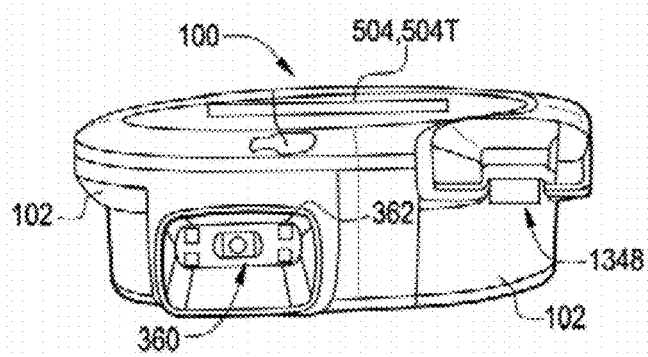
Figure 9C:
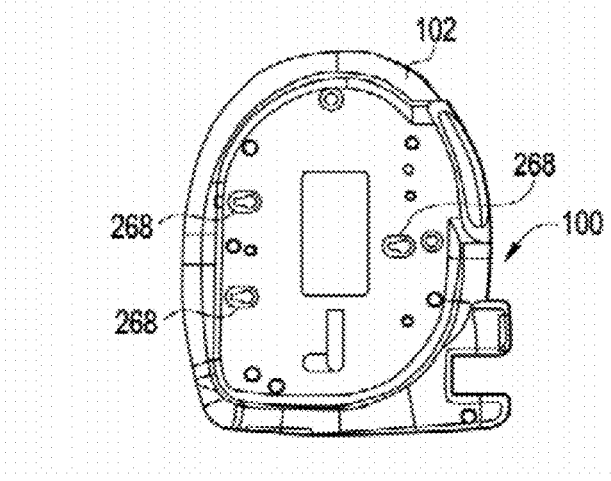

In the embodiment of FIGS. 9a-9c, the EIR terminal 100 is in the form of a transaction terminal which may be configured as a retail purchase transaction terminal or as a price verifier. Housing 102 of the transaction terminal shown in FIGS. 9a-9c is configured to be portable so that it can be moved from location to location and is further configured to be replaceably mounted on a fixed structure such as a fixed structure of a cashier station or a fixed structure of the retail store floor (e.g., a shelf, a column 264 best viewed in FIG. 10b). Referring to bottom view of FIG. 9c, the housing 102 of the EIR terminal 100 has formations 268 facilitating the replaceable mounting of EIR terminal 100 on a fixed structure. Referring now to FIG. 9b, EIR terminal 100 includes a display 504 having an associated touch screen 504T, a card reader 1348, an imaging module 360, and a luminous shroud 362. When light from the illumination block (not shown in FIG. 10) strikes luminous shroud 362, the shroud glows to attract attention to the location of imaging assembly. In certain operating modes as indicated in FIG. 10c, the EIR terminal 100 in accordance with any of FIGS. 9a-9c, displays on display 504 a PIN entry screen prompting a customer to enter PIN information into touch screen 504T. In other operating modes, as indicated in FIG. 10d, the EIR terminal 100 displays on display 504 a signature prompt screen prompting a customer to enter signature information into the device with use of a stylus 505.

Referring to FIGS. 10a and 10b, various installation configurations for the EIR terminal of FIGS. 9a-9c are shown. In the view of FIG. 10a, the EIR terminal 100 is installed as a retail purchase transaction terminal at a point of sale cashier station. In the setup of FIG. 10a, the EIR terminal 100 is configured as a retail purchase transaction terminal and is utilized to aid and facilitate retail transactions at a point of sale. A customer may enter a credit card or a debit card into card reader 1348 and retail purchase transaction terminal may transmit the credit card information to credit/debit authorization network.

In the view of FIG. 10b, the EIR terminal 100 is configured as a price verifier to aid customers in checking prices of products located on a store floor. EIR terminal 100 may be mounted on a shelf (not shown in FIG. 10b) or on a column 254 or other fixed structure of the retail store. EIR terminal 100 may decode bar code data from bar codes on store products and transmit decoded out bar code messages to a store server for lookup of price information which is sent back from the store server to terminal 100 for display on display 504.

A small sample of systems methods and apparatus that are described herein is as follows:

A1 An encoded information reading (EIR) terminal comprising:
- a microprocessor;
- a memory communicatively coupled to said microprocessor;
- an EIR device selected from the group consisting of: a bar code reading device, an RFID reading device, and a card reading device, said EIR device configured to perform at least one of: outputting raw message data comprising an encoded message and outputting decoded message data corresponding to an encoded message;
- a multi-band antenna; and
- a wireless communication interface configured to support at least two wireless communication protocols;
- wherein said multi-band antenna is configured to simultaneously receive two or more radio signals in two or more frequency regulatory domains; and
- wherein said EIR terminal is configured to dynamically select at least one of: a wireless communication network and a wireless communication protocol by optimizing a value of a wireless communication protocol selection criterion, said wireless communication protocol selection criterion based on said two or more radio signals.

A2. The EIR terminal of A1, wherein said wireless communication protocol selection criterion is based on at least one of: a signal strength of said radio signals, a wireless network status, a wireless network usage cost, and a wireless network throughput.

A3. The EIR terminal of A1, wherein said multi-band antenna is further configured to transmit radio signals in two or more frequency regulatory domains.

A4. The EIR terminal of A1, wherein said wireless communication interface is configured to support at least two of: GSM, GPRS, EDGE, UMTS (WCDMA/TD-SCDMA), HSPA/HSPA+, CDMA, CDMA2000, CDMA 1xEvDo, TDMA, LTE (FDD-LTE or TD-LTE), UWB, 802.11, 802.15, and 802.16m (WiMax) wireless communication protocols.

A5. The EIR terminal of A1, wherein said two or more frequency regulatory domains include two or more of: 850 MHz, 900 MHz, 1700 MHz, 1800 MHz, 1900 MHz, 2100 MHz, 2.4 GHz, and 5 GHz.

A6. The EIR terminal of A1, wherein said multi-band antenna has a size of less than one tenth of said radio signal wavelength.

A7. The EIR terminal of A1, wherein said multi-band antenna comprises at least one feed.

A8. The EIR terminal of A1, wherein said multi-band antenna comprises a splitter/diplexer.

A9. The EIR terminal of A1, wherein said multi-band antenna comprises an impedance match circuit.

A10. The EIR terminal of A1 further comprising at least one connector configured to receive a SIM card.

A11. The EIR terminal of A1, wherein said memory is configured to store:
- a first wireless account data structure comprising a first wireless account identifier; and
- a second wireless account data structure comprising a second wireless account identifier.

A12. The EIR terminal of A1, wherein said memory is configured to store:
- a first wireless account data structure comprising a first wireless account identifier and one of: a first preferred routing list, a first preferred operator list; and
- a second wireless account data structure comprising a second wireless account identifier and one of: a second preferred routing list, a second preferred operator list.

B1. An encoded information reading (EIR) terminal comprising:
- a microprocessor;
- a memory communicatively coupled to said microprocessor;
- an EIR device selected from the group consisting of: a bar code reading device, an RFID reading device, and a card reading device, said EIR device configured to perform at least one of: outputting raw message data comprising an encoded message and outputting decoded message data corresponding to an encoded message;
- a wireless communication interface configured to support at least two wireless communication protocols, said wireless communication interface comprising an RF front end configured to perform at least one of: receiving a first radio signal and transmitting a second radio signal; and
- an antenna electrically coupled by said RF front end, said antenna provided by at least one of: two or more single-band antennas, a multi-band antenna;
- wherein said antenna is configured to simultaneously receive two or more radio signals in two or more frequency regulatory domains;
- wherein said microprocessor is configured to execute at least one of: a base band encoder software program and a base band decoder software program; and
- wherein said EIR terminal is configured to dynamically select at least one of: a wireless communication network and a wireless communication protocol by optimizing a value of a wireless communication protocol selection criterion, said wireless communication protocol selection criterion based on said two or more radio signals.

B2. The EIR terminal of B1, wherein said wireless communication protocol selection criterion is based on at least one of: a signal strength of said radio signals, a wireless network status, a wireless network usage cost, and a wireless network throughput.

B3. The EIR terminal of B1, wherein said antenna is further configured to transmit radio signals in two or more frequency regulatory domains.

B4. The EIR terminal of B1, wherein said wireless communication interface is configured to support at least two of: GSM, GPRS, EDGE, UMTS (WCDMA/TD-SCDMA), HSPA/HSPA+, CDMA, CDMA2000, CDMA 1xEvDo, TDMA, LTE (FDD-LTE or TD-LTE), UWB, or 802.16m (WiMax) wireless communication protocols.

B5. The EIR terminal of B1, wherein said two or more frequency regulatory domains include two or more of: 850 MHz, 900 MHz, 1700 MHz, 1800 MHz, 1900 MHz, 2100 MHz, 2.4 GHz, and 5 GHz.

B6. The EIR terminal of B1 further comprising at least one connector configured to receive a SIM card.

B7. The EIR terminal of B1, wherein said memory is configured to store:
- a first wireless account data structure comprising a first wireless account identifier; and
- a second wireless account data structure comprising a second wireless account identifier.

B8. The EIR terminal of B1, wherein said memory is configured to store:
a first wireless account data structure comprising a first wireless account identifier and one of: a first preferred routing list, a first preferred operator list; and
a second wireless account data structure comprising a second wireless account identifier and one of: a second preferred routing list, a second preferred operator list.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or more than the mentioned certain number of elements. Also, while a number of particular embodiments have been set forth, it will be understood that features and aspects that have been described with reference to each particular embodiment can be used with each remaining particularly set forth embodiment.

We claim:

1. An encoded information reading (EIR) terminal comprising:
a microprocessor;
a memory communicatively coupled to said microprocessor;
an EIR device comprising an imaging-based bar code reading device and/or a laser-based bar code reading device, said EIR device configured to perform at least one of: outputting raw message data comprising an encoded message and outputting decoded message data corresponding to an encoded message;
a multi-band antenna comprised of metamaterial (MTM); and
a wireless communication interface configured to support at least two wireless communication protocols;
wherein said multi-band metamaterial (MTM) antenna is configured to simultaneously receive two or more radio signals in two or more frequency regulatory domains,
wherein each one of said two or more radio signals is received by said multi-band metamaterial (MTM) antenna over at least one of: a distinct wireless communication network, and a distinct wireless communication protocol; and
wherein said EIR terminal is configured to dynamically select at least one of: a wireless communication network and a wireless communication protocol by optimizing a value of a wireless communication protocol selection criterion, said wireless communication protocol selection criterion based on said two or more radio signals.

2. The EIR terminal of claim 1, wherein said wireless communication protocol selection criterion is based on at least one of: a signal strength of said radio signals, a wireless network status, a wireless network usage cost, and a wireless network throughput.

3. The EIR terminal of claim 1, wherein said multi-band metamaterial (MTM) antenna is further configured to transmit radio signals in two or more frequency regulatory domains.

4. The EIR terminal of claim 1, wherein said wireless communication interface is configured to support at least two of: GSM, GPRS, EDGE, UMTS (WCDMA/TD-SCDMA), HSPA/HSPA+, CDMA, CDMA2000, CDMA 1xEvDo, TDMA, LTE (FDD-LTE or TD-LTE), UWB, 802.11, 802.15, and 802.16m (WiMax) wireless communication protocols.

5. The EIR terminal of claim 1, wherein said two or more frequency regulatory domains include two or more of: 850 MHz, 900 MHz, 1700 MHz, 1800 MHz, 1900 MHz, 2100 MHz, 2.4 GHz, and 5 GHz.

6. The EIR terminal of claim 1, wherein said multi-band metamaterial (MTM) antenna has a size of less than one tenth of said radio signal wavelength.

7. The EIR terminal of claim 1, wherein said multi-band metamaterial (MTM) antenna comprises at least one feed.

8. The EIR terminal of claim 1, wherein said multi-band metamaterial (MTM) antenna comprises a splitter/diplexer.

9. The EIR terminal of claim 1, wherein said multi-band metamaterial (MTM) antenna comprises an impedance match circuit.

10. The EIR terminal of claim 1 further comprising at least one connector configured to receive a SIM card.

11. The EIR terminal of claim 1, wherein said memory is configured to store:
a first wireless account data structure comprising a first wireless account identifier; and
a second wireless account data structure comprising a second wireless account identifier.

12. The EIR terminal of claim 1, wherein said memory is configured to store:
a first wireless account data structure comprising a first wireless account identifier and one of: a first preferred routing list, a first preferred operator list; and
a second wireless account data structure comprising a second wireless account identifier and one of: a second preferred routing list, a second preferred operator list.

13. An encoded information reading (EIR) terminal comprising:
a microprocessor;
a memory communicatively coupled to said microprocessor;
an EIR device comprising an imaging-based bar code reading device and/or a laser-based bar code reading device, said EIR device configured to perform at least one of: outputting raw message data comprising an encoded message and outputting decoded message data corresponding to an encoded message;
a wireless communication interface configured to support at least two wireless communication protocols, said wireless communication interface comprising an RF front end configured to perform at least one of: receiving a first radio signal and transmitting a second radio signal; and
an antenna comprising metamaterial (MTM) that is electrically coupled by said RF front end, said metamaterial (MTM) antenna provided by at least one of: two or more single-band antennas, a multi-band antenna;
wherein said metamaterial (MTM) antenna is configured to simultaneously receive two or more radio signals in two or more frequency regulatory domains,
wherein each one of said two or more radio signals is received by said multi-band antenna over at least one of: a distinct wireless communication network, and a distinct wireless communication protocol;
wherein said microprocessor is configured to execute at least one of: a base band encoder software program and a base band decoder software program; and
wherein said EIR terminal is configured to dynamically select at least one of: a wireless communication network and a wireless communication protocol by optimizing a value of a wireless communication protocol selection criterion, said wireless communication protocol selection criterion based on said two or more radio signals.

14. The EIR terminal of claim 13, wherein said wireless communication protocol selection criterion is based on at least one of: a signal strength of said radio signals, a wireless network status, a wireless network usage cost, and a wireless network throughput.

15. The EIR terminal of claim 13, wherein said metamaterial (MTM) antenna is further configured to transmit radio signals in two or more frequency regulatory domains.

16. The EIR terminal of claim 13, wherein said wireless communication interface is configured to support at least two of: GSM, GPRS, EDGE, UMTS (WCDMA/TD-SCDMA), HSPA/HSPA+, CDMA, CDMA2000, CDMA 1xEvDo, TDMA, LTE (FDD-LTE or TD-LTE), UWB, or 802.16m (WiMax) wireless communication protocols.

17. The EIR terminal of claim 13, wherein said two or more frequency regulatory domains include two or more of: 850 MHz, 900 MHz, 1700 MHz, 1800 MHz, 1900 MHz, 2100 MHz, 2.4 GHz, and 5 GHz.

18. The EIR terminal of claim 13 further comprising at least one connector configured to receive a SIM card.

19. The EIR terminal of claim 13, wherein said memory is configured to store:
   a first wireless account data structure comprising a first wireless account identifier; and
   a second wireless account data structure comprising a second wireless account identifier.

20. The EIR terminal of claim 13, wherein said memory is configured to store:
   a first wireless account data structure comprising a first wireless account identifier and one of: a first preferred routing list, a first preferred operator list; and
   a second wireless account data structure comprising a second wireless account identifier and one of: a second preferred routing list, a second preferred operator list.

* * * * *